US007724816B2

(12) United States Patent
Chen et al.

(10) Patent No.: US 7,724,816 B2
(45) Date of Patent: May 25, 2010

(54) DYNAMIC SWITCHING BETWEEN MAXIMUM LIKELIHOOD SEQUENCE ESTIMATION (MLSE) AND LINEAR EQUALIZER FOR SINGLE ANTENNA INTERFERENCE CANCELLATION (SAIC) IN A GLOBAL SYSTEM FOR MOBILE COMMUNICATIONS (GSM) SYSTEM

(75) Inventors: Weizhong Chen, Austin, TX (US); Leo G. Dehner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 978 days.

(21) Appl. No.: 11/225,282

(22) Filed: Sep. 13, 2005

(65) Prior Publication Data

US 2007/0058709 A1 Mar. 15, 2007

(51) Int. Cl.
*H03H 7/30* (2006.01)
(52) U.S. Cl. ........................ 375/231; 375/229; 375/232
(58) Field of Classification Search ................. 375/229, 375/231, 232
See application file for complete search history.

(56) References Cited

U.S. PATENT DOCUMENTS

| | | | |
|---|---|---|---|
| 6,081,566 A | 6/2000 | Molnar et al. | |
| 6,473,506 B1 | 10/2002 | Hook et al. | |
| 6,724,809 B2 | 4/2004 | Reznik | |
| 6,731,700 B1 | 5/2004 | Yakhnich et al. | |
| 6,735,248 B2 | 5/2004 | Gu et al. | |
| 2001/0050967 A1* | 12/2001 | Kuzminskiy et al. | ........ 375/350 |
| 2003/0035469 A1 | 2/2003 | Frank et al. | |
| 2004/0096012 A1 | 5/2004 | Yang | |
| 2004/0161065 A1 | 8/2004 | Buckley et al. | |
| 2004/0170234 A1 | 9/2004 | Pukkila et al. | |
| 2004/0171364 A1 | 9/2004 | Pukkila | |
| 2005/0084045 A1 | 4/2005 | Stewart et al. | |
| 2005/0100105 A1 | 5/2005 | Jensen | |
| 2005/0201493 A1* | 9/2005 | Onggosanusi et al. | ........ 375/340 |
| 2006/0203943 A1* | 9/2006 | Scheim et al. | .............. 375/341 |

FOREIGN PATENT DOCUMENTS

EP         1569399 A1      8/2005

OTHER PUBLICATIONS

Kuzminskiy, "Comparison of linear and MLSE spatio-temporal interference rejection combining with an antenna array in a GSM system", 2000 IEEE 51st, Vehicular Technology Conference Proceedings, 2000, VTC 2000-Spring Tokyo, vol. 1, May 15-18, 2000 pp. 172-176 vol. 1.*

(Continued)

*Primary Examiner*—Juan A Torres
(74) *Attorney, Agent, or Firm*—Dillon & Yudell LLP (57) ABSTRACT

In a GSM/EDGE Single Antenna Interference Cancellation (SAIC) operation environment, a mobile station is required to operate in a wide range of interference levels. An SAIC linear equalizer that takes advantage of the GMSK signal structure performs better than a conventional Maximum Likelihood Sequence Estimation (MLSE) equalizer in high interference levels, while it performs worse in low interference levels. A dynamic selection between the SAIC linear equalizer and the MLSE equalizer for each received burst is achieved to provide the optimal performance across the entire required operation environments. The dynamic selection is based on the estimated noise plus interference energy relative to the total received signal energy. The soft information calculated by the two categories of equalizers is properly scaled to generate soft information with balanced magnitude.

23 Claims, 4 Drawing Sheets

OTHER PUBLICATIONS

Moisio, "The effect of single-antenna interference cancellation on GPRS performance", 1st International Symposium on Wireless Communication Systems, 2004. Sep. 20-22, 2004 pp. 1-5.*

Forney, "Maximum likelihood sequence estimation of digital sequences in the presence of intersymbol interference", IEEE Trans Inform Theory, vol. IT-18, No. 3, pp. 363-378 May 1972.*

Paulraj, "Space-time processing for wireless communication" IEEE Signal Processing Magazine, pp. 40-84, Nov. 1997.*

International Search Report and Written Opinion.

Moisio, et al., The Effect of Single-Antenna Interference Cancellation on GPRS Performance, Nokia Research Center, Nokia Group, Finland.

*1st International Symposium on Wireless Communication Systems*, 2004. Publication Date: Sep. 20-22, 2004 On pp. 1-5.

* cited by examiner

DYNAMIC SWITCHING BETWEEN MAXIMUM LIKELIHOOD SEQUENCE ESTIMATION (MLSE) AND LINEAR EQUALIZER FOR SINGLE ANTENNA INTERFERENCE CANCELLATION (SAIC) IN A GLOBAL SYSTEM FOR MOBILE COMMUNICATIONS (GSM) SYSTEM

CROSS-REFERENCE TO RELATED APPLICATIONS

The present application is related to the following U.S. patent applications, and incorporated herein by reference in their entirety:

Ser. No. 11/205,450, entitled "Modulation Detection In A SAIC Operational Environment", filed on Aug. 16, 2005.

BACKGROUND OF THE INVENTION

1. Field of the Invention

The present invention relates in general to digital communication systems and in particular to mobile radio systems. Still more particularly, the invention relates to a method of reception and a receiver in a mobile radio system operating in a single antenna interference cancellation environment.

2. Description of the Related Art

The most widespread standard in cellular wireless communications is currently the Global System for Mobile Communications (GSM). GSM employs a combination of Time Division Multiple Access (TDMA) and Frequency Division Multiple Access (FDMA) for the purpose of sharing the spectrum resource. GSM networks typically operate in the 900 MHz frequency range. Radio spectrum in the 890-915 MHz bands is for the uplink (mobile station to base station) and in the 935-960 MHz bands is for the downlink (base station to mobile station). The spectrum for both uplink and downlink is divided into 200 kHz-wide carrier frequencies using FDMA, and each base station is assigned one or more carrier frequencies. Each carrier frequency is divided into eight time slots using TDMA. Eight consecutive time slots form one TDMA frame, with a duration of 4.615 ms. A physical channel occupies one time slot within a TDMA frame. Each time slot within a frame is also referred to as a burst. TDMA frames of a particular carrier frequency are numbered, and formed in groups of 26 or 51 TDMA frames called multi-frames.

GSM systems typically employ one or more modulation schemes to communicate information such as voice, data, and/or control information. These modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (kbps). While GSM is sufficient for standard voice services, high-fidelity audio and data services demand higher data throughput rates.

General Packet Radio Service (GPRS) is a non-voice service that allows information to be sent and received across a mobile telephone network. It supplements Circuit Switched Data (CSD) and Short Message Service (SMS). GPRS employs the same modulation schemes as GSM, but higher data throughput rates are achievable with GPRS since it allows for all eight time slots to be used by a single mobile station at the same time.

The EDGE (Enhanced Data rates for GSM Evolution) and the associated packet service EGPRS (Enhanced General Packet Radio Service) have been defined as a transitional standard between the GSM/GPRS (Global System for Mobile Communications/General Packet Radio Service) and UMTS (Universal Mobile Telecommunications System) mobile radio standards. Both GMSK modulation and 8-PSK modulation are used in the EDGE standard, and the modulation type can be changed from burst to burst. GMSK is a non-linear, Gaussian-pulse-shaped frequency modulation, and 8-PSK modulation in EDGE is a linear, 8-level phase modulation with $3\pi/8$ rotation. However, the specific GMSK modulation used in GSM can be approximated with a linear modulation (i.e., 2-level phase modulation with a $\pi/2$ rotation). The symbol pulse of the approximated GSMK and the symbol pulse of the 8-PSK are identical.

Wireless communication systems have an ever-increasing demand on capacity to transfer both voice and data services. In GSM communication systems, one way to increase system capacity is to increase the frequency reuse factor, whereby the communications system allocates the same frequency to multiple sites in closer proximity. However, stray signals or signals intentionally introduced by frequency reuse methods can interfere with the proper transmission and reception of voice and data signals and can lower capacity. As a result, a receiver must be capable of processing a signal with interference from other channels and extracting the desired information sent to a user.

It is well known that the major source of noise and interference experienced by GSM communication devices operating in typical cellular system layouts supporting a non-trivial number of users is due to co-channel or adjacent channel interference. Such noise sources arise from nearby devices transmitting on or near the same channel as the desired signal or from adjacent channel interference such as noise arising on the desired channel due to spectral leakage, for example. Additionally, even in the case where no other signal interference is present, the received signal may consist of multiple copies of the transmitted data sequence due to multi-path channel conditions, for example. This effect is sometimes referred to as self-interference.

Traditionally, interference cancellation techniques have had limited success focusing on adjacent channel suppression by using several filtering operations to suppress the frequencies of the received signal that are not also occupied by the desired signal. Correspondingly, co-channel interference techniques have been proposed, such as joint demodulation, which generally require joint channel estimation methods to provide a joint determination of the desired and co-channel interfering signal channel impulse responses. Given known training sequences, all the co-channel interference can be estimated jointly. However, this joint demodulation requires a large amount of processing power, which constrains the number of equalization parameters that can be used efficiently.

A recently proposed standard for advanced communications systems and receiver algorithms called Single Antenna Interference Cancellation (SAIC) is designed for the purpose of improving system capacity through increasing frequency reuse. SAIC performs in the presence of co-channel interference resulting from the increased frequency reuse by enhancing single-antenna receiver performance. Current SAIC receiver algorithms are generally optimized for GMSK modulated signals, since gains of SAIC tend to be smaller for 8-PSK modulated signals. In an SAIC operational environment, GMSK traffic on neighboring cells can reuse common frequencies, thereby significantly increasing network bandwidth, while still tolerating the significantly higher co-channel and multi-channel interference than can be accommodated by conventional GMSK/EDGE environments.

In Additive White Gaussian Noise (AWGN) dominated environments, such as a conventional GSM/EDGE environment, Maximum Likelihood Sequence Estimation (MLSE) is the optimal solution. However, in co-channel and adjacent channel dominated environments (low carrier/interference (C/I) environments), such as a SAIC operational environment, a linear equalizer technique that takes advantage of the GMSK signal structure provides the superior performance. In actual SAIC operational environments, however, co-channel and adjacent channel interference is not always strong, depending on the traffic and system allocation. For example, to provide different quality of services, the system may allocate different data rates and coding schemes or allocate higher priority channel access by controlling the levels of co-channel and adjacent channel interference from other users. In other words, a particular SAIC enabled mobile station will be expected to operate in a very wide range of co-channel and adjacent channel interference levels. What is needed is an equalization methodology that provides superior performance in both high and low interference levels for mobile stations capable of operating in SAIC operational environments.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of electronic devices such as portable digital assistants, digital cameras, portable storage devices, audio players and portable gaming devices, for example. In the description below, any notation $(.)^*, (.)^T, (.)^H, (.)^{-1}$ represents the complex conjugate, transposition, conjugate transposition, and inversion of matrices, respectively.

Figure 1:
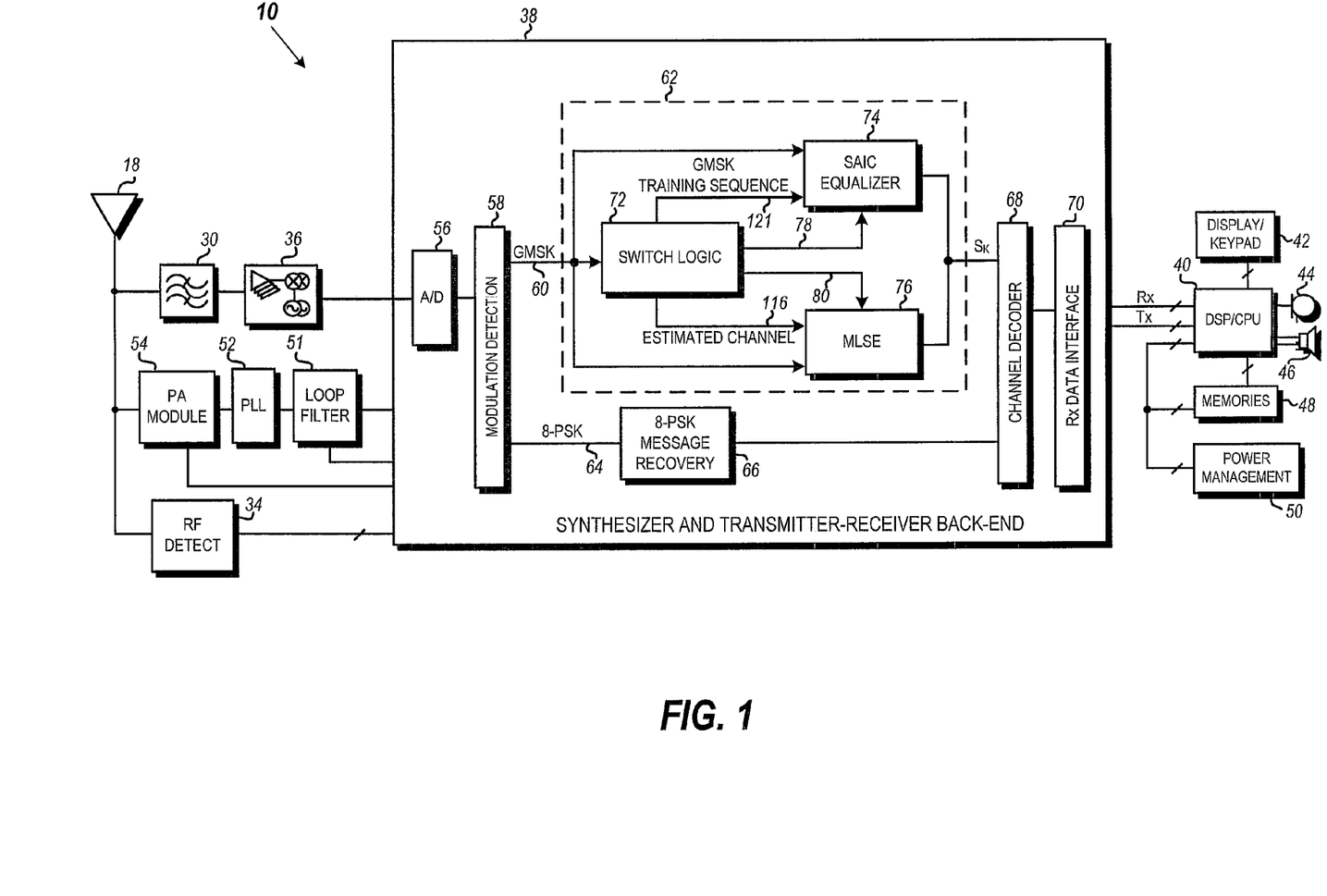
FIG. 1 shows a block diagram of a wireless mobile communication device, in accordance with a preferred embodiment of the present invention.

With reference now to the Figures, and in particular in reference to FIG. 1, there is shown a block diagram of a wireless mobile communication device, in accordance with a preferred embodiment of the present invention. In this embodiment, the wireless mobile communication device 10 may be, for example, a cellular handset, a wireless-enabled laptop computer, a one or two-way pager, or some other wireless communication device.

Wireless mobile communication device 10 generally comprises antenna 18 coupled to a filter 30, a power amplifier (PA) 54, and a radio frequency (RF) detector 34. Filter 30 is coupled to receiver (Rx) front-end block 36, which contains standard receiver components such as gain stages, mixers, oscillators, etc., as generally depicted, and mixes the received RF transmission down to base band. Rx front-end block 36 has an output coupled to a synthesizer and transmitter/receiver (Tx/Rx) back-end block 38, which in turn is coupled to a digital signal processor/central processing unit (DSP/CPU) 40 over transmit (Tx) and receive (Rx) connections, or alternatively a communications bus (not shown). The synthesizer and Tx/Rx block 38 is also coupled through loop filter 51 to a phase lock loop (PLL) 52 that generates RF transmission signals for amplification by power amplifier (PA) module 54 and transmission over antenna 18. The receiver front-end block 36 and synthesizer and transmitter/receiver back-end block 38 are preferably integrated circuits (ICs), although other embodiments may be implemented.

DSP/CPU 40 has memories 48 associated therewith, for example read-only memory (ROM) and read/write random access memory (RAM). Various input and output devices are coupled to the CPU, including a display and keypad referenced with a common identifier 42, a microphone 44 and speaker 46. The exemplary embodiment also includes a power management module 50.

Tx/Rx back-end block 38 is shown containing the block components of a message recovery path coupling Rx front-end block 36 to a receive (Rx) input of DSP/CPU 40. As will be appreciated by those skilled in the art, Tx/Rx back-end block 38 is comprised of additional components that are not shown in FIG. 1 to simplify the following description of a preferred embodiment. Analog-to-digital (A/D) converter 56 is coupled to Rx front-end block 36 to digitally convert the received transmission signals into data packets. Modulation detector 58 is coupled to A/D converter 56 to receive the digital transmission data from A/D converter 56, and detect the modulation type of a received packet.

In a preferred embodiment, wireless communication device 10 is configured for EDGE operation in either a GMSK or 8-PSK modulation mode. If modulation detector 58 detects GMSK modulation in the received signal, the EDGE burst is output on GMSK signal 60 to be received by a SAIC-GMSK message recovery module shown at block 62, where SAIC algorithms, such as Minimum Mean Square Error Block Linear Equalizer ("MMSE-BLE") for example, perform message recovery of the GMSK modulated signals. Similarly, if 8-PSK modulation is detected by modulation detector 58, the EDGE burst is output on connection 64 to be received by 8-PSK message recovery module shown at block 66, where message recovery is performed on the 8-PSK modulated signals in a manner known in the art. Each of the message recovery modules shown at blocks 62, 66 rotates the received packet by the phase rotation factor for the particular modulation being detected in the data path, in this case, each of the two modulation types, GMSK and PSK. In the embodiment shown in FIG. 1, SAIC-GMSK message recovery block 62 performs a rotation of $\pi/2$ on the received symbols. Similarly, 8-PSK message recovery block 66 performs a rotation of 3π/8 on the received symbols. Accordingly, each of the message recovery blocks 62, 66 generate a recovered message at their outputs, respectively.

In accordance with a preferred embodiment of the present invention, SAIC-GMSK message recovery block 62 dynamically selects between the SAIC linear equalization method and the MLSE method to perform the message recovery as a function of the detected the level of carrier-to-interference ratio in the current operating environment. MLSE equalization has preferred performance in low interference operational environments and GMSK linear equalization has a preferred performance in high interference operational environments. The preferred embodiment performs MLSE equalization methodology when the total energy value is greater than the threshold value and performs GMSK linear equalization when the total energy value is less than the threshold value. The operating environment, as defined here, pertains to (a) the actual physical environment in which the system must operate, which in this case is well encapsulated in the mobile/wireless channel model (plus operating band), and (b) the application and service under consideration as particular attributes.

GMSK received signal 60 is coupled to each of SAIC Soft Information Calculation 74, Switch Logic 72 and MLSE Soft Information Calculation 76 within SAIC-GMSK message recovery block 62. Switch Logic 72 performs computations to generate a decision to enable, through select signal 78, the SAIC Soft Information Calculation 74 or, through select signal 80, the MLSE Soft Information Calculation 76 to recover the received burst. If the SAIC equalizer is to be used to recover the burst, the GMSK training sequence is also provided to the SAIC Soft Information Calculation 74. If the MLSE Equalizer is to be used to recover the burst, the Switch Logic 72 also provides the estimated channel 116 to the MLSE Soft Information Calculation 76. The Switch Logic 72 analyzes the received GMSK signal of a burst. If the analysis reveals that the received signal experienced small interference in the channel, the Switch Logic 72 enables the SAIC Soft Information Calculation 74 through select signal 78. Otherwise, the received signal experienced large interference and the MLSE Equalizer block is enabled through select signal 80. The SAIC Equalizer block uses the GMSK training sequence and the π/2-rotated GMSK signal to recover the message bits by taking advantage of the GMSK signal structure. The MLSE Equalizer uses the received GMSK signal and the estimated channel to recover the message bits by using Maximum Likelihood Sequence Estimation technique. As will be appreciated, the equalization methodology provided by SAIC-GMSK message recovery block 62 provides superior interference cancellation performance in both high and low interference environments by dynamically switching between the SAIC Linear Equalizer approach if the received signal has experienced high interference environments, such as that seen in SAIC (low carrier/interference (C/I)), and a MLSE methodology if the received signal experienced low interference environments (high C/I) to achieve full performance of the receiver implementing SAIC.

Channel decoder 68 is coupled to SAIC-GMSK and 8-PSK message recovery blocks 62, 66 to receive recovered message packets and perform channel decoding thereon. Channel decoder 68 is coupled to receive data interface 70, which buffers and transfers decoded packets to DSP-CPU 40 for application processing. As will be appreciated, the functions performed by blocks 56, 58, 62, 66, 68 and 70 may be implemented in either hardware or software, or a combination thereof.

Figure 2:
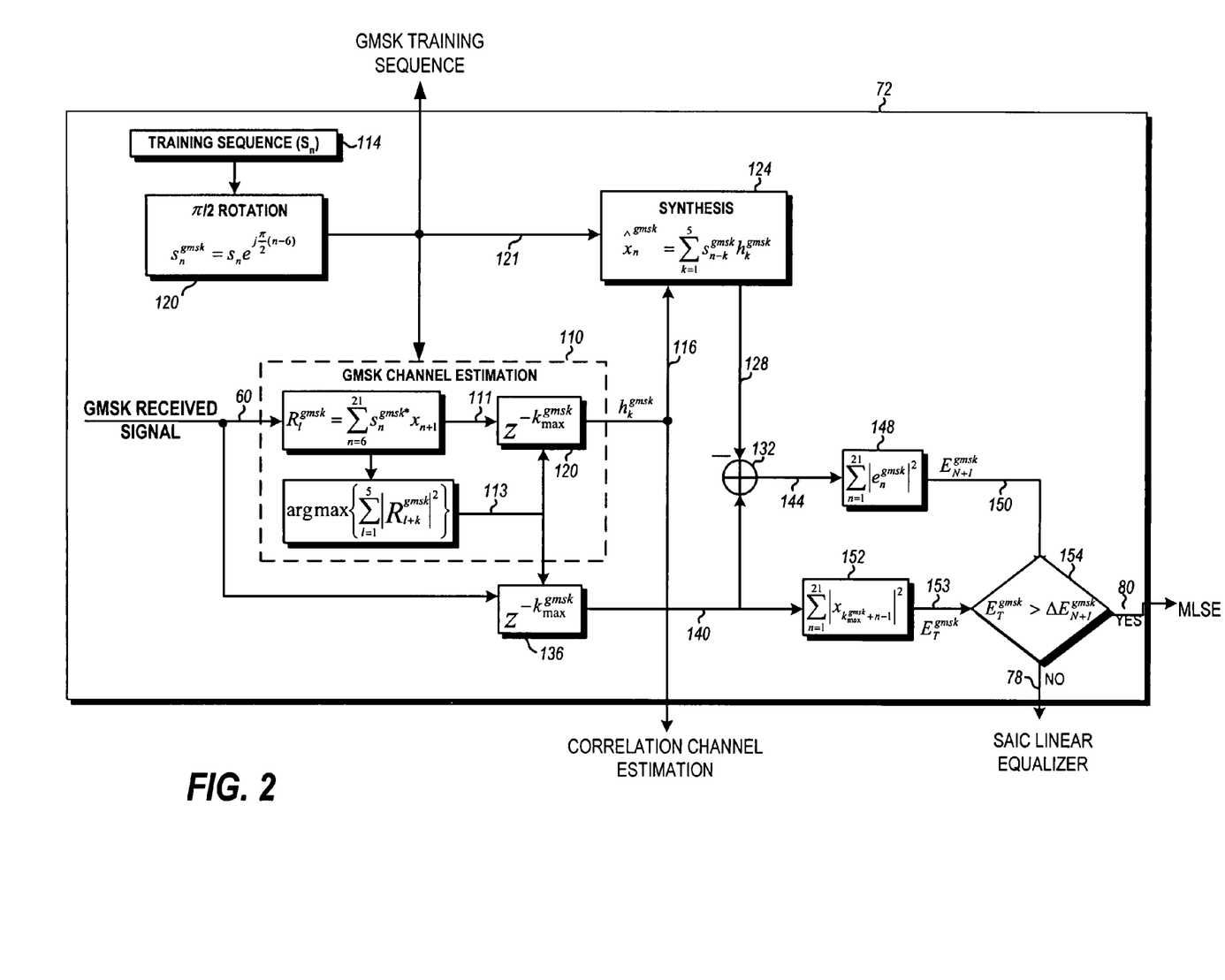
FIG. 2 shows a logical flow diagram of a method for dynamically selecting an equalization method in a receiver of a wireless communication device based on detected signal interference, in accordance with a preferred embodiment of the present invention.

With reference now to FIG. 2, there is shown a logical flow diagram of a method for dynamically selecting an equalization method for a GMSK burst in switch logic 72 in a receiver of a wireless communication device 10, in accordance with a preferred embodiment of the present invention. The midamble training sequence of the received GMSK burst 60 is sampled at one sample per symbol by GMSK channel estimation module 110, resulting in training symbol signals ($x_n$).

The training sequence 114 is an original training sequence held in the receiver and known to be the training sequence used by the transmitter for a given transmission. Training sequence 114 is denoted by $s_n$, n=1, 2 ... N, where N denotes the length of the training sequence. For example, N=26 in a standard EDGE embodiment. Although preferred, the present invention is not restricted to using the training sequence, which is normally included in a data burst, in the described manner. In principle, it is also possible to use any other sequence of information data that is transmitted during the communication process to determine a preferred equalization type, in accordance with the invention.

The GMSK rotated training sequence is generated by rotation module 120 through a rotation of π/2 to each symbol of training sequence 114 as follows:

$$s_n^{gmsk} = s_n e^{j1/2\pi(n-6)}$$

Accordingly, rotation module 120 generates a set of rotated training samples for the associated modulation type at its output, as rotated sequence 121.

Channel estimation blocks 110 performs a correlation between the received training signals, ($x_n$), and the rotated training sequence 121. Therefore, a channel estimation for the GMSK training sequences may then be estimated by: $\hat{h}_n = x_n^{gmsk} \oplus s^*_{-n}{}^{gmsk}$, where $\oplus$ represents a convolution operation and * represents a complex conjugate operation.

Accordingly, GMSK channel estimation module 110 produces a correlation vector, R (output as signal 111), of 13 symbol periods. R is a correlation between the received training sample signals ($x_n$) and the complex conjugate of the GMSK rotated training samples ($S_n^{gmsk*}$) as follows:

$$R_l^{gmsk} = \frac{1}{16} \sum_{n=6}^{21} s_n^{gmsk*} x_{n+l}$$

Channel estimation module 110 then calculates a temporal position function using a five-point moving average of the magnitude squared of the correlation vector for GMSK as follows:

$$E_h^{gmsk}(l) = \sum_{n=1}^{5} |R_{n+l-1}^{gmsk}|^2,$$

$$l = 1, 2, \cdots, 9$$

These moving averages of the correlations allows the detection of the arrival time of the training sequence in the received burst. Channel estimation module 110 selects the index of the maximum of the 5-point moving average for the GMSK modulation to be output as signal 113, as follows:

$$\arg\max\left\{\sum_{l=1}^{5}|R_{l+k}^{gmsk}|^2\right\}$$

Signal 113 represents a timing of the training sequence in the received signal, which can be used to derive the starting point of the training sequence in the received signal. Then, module 120 identifies the 5 points of the correlation 111 corresponding to the maximum index, based on timing signal 113, as the estimated channel ($h_k^{gmsk}$) 116. Similarly, module 136 identifies the 21 points of the received training sequence of the GMSK signal 60 with the correct timing based on timing signal 113. This results in the correctly-timed, received GMSK training sequence on its output, as GMSK training signals 140.

An estimation ($\hat{x}_n^{gmsk}$) of the received GMSK training signals ($x_n^{gmsk}$) can be synthesized from the estimated channel impulse response $h_k$ and the training sequence ($s_n^{gmsk}$). As seen in FIG. 2, the GMSK estimated channel ($h_k^{gmsk}$) 116 is passed to synthesis module 124 to produce the estimated training signal ($\hat{x}_n^{gmsk}$). Synthesis module 124 convolves the rotated training sequence 121 with the received channel estimation 116 to create the training signal 128, which has been rotated for GMSK modulation and simulated with the channel characteristics. In the case that the estimated channel has a length of 5 symbol periods, the estimation of the received GMSK training signal can be represented by $$\hat{x}_n^{gmsk} = \sum_{k=1}^{5} s_{n-k}^{gmsk} h_k = s_n^{gmsk} * h_n$$

Where $h_k^{gmsk}$ is the composite channel estimation (impulse response) 116, and k=1, 2, 3, 4, 5. This composite response includes the transmitter filter, over-the-air channel effects, receiver filter, Analog/Digital conversion, etc.

The received GMSK training signals 140, timed by signal 113, is subtracted from the synthesized signals 128 by combiners 132 to generate error signals 144. Error signals 144 indicate the difference between the received training signal in signal 60 and the estimated training signal 128.

A sum-squared calculation is applied to the GMSK error signals 144 by module 148 to calculate a total energy of the error signals as follows:

$$\sum_{n=1}^{21}|e_n^{gmsk}|^2$$

This generates an error energy ($E_{NI}^{gmsk}$) 150 calculated as a function of the total noise plus co-channel interference detected in the GMSK channel. As will be appreciated, this error energy 150 will be lower for cases where the GMSK signal is transmitted in a high C/I environment.

Module 152 calculates the total energy ($E_T^{gmsk}$) 153 of the portion of the received signal 60 corresponding to the training sequence using the GMSK time-corrected training signal 140. In accordance with the preferred embodiment, module 152 calculates the total energy 153 by a sum-squared calculation, across 21 symbol periods, and in one embodiment, timed to the GMSK timing signal 113, as:

$$\sum_{n=1}^{21}|x_{k_{max}^{gmsk}+n-1}|^2$$

In an alternative embodiment, the total energy is calculated by a sum-squared calculation, across 21 symbol periods, using the nominal timing directly the GMSK received signal 60.

The resulting error signal energy and total energy values, $E_{NI}^{gmsk}$ and $E_T^{gmsk}$, are generated from modules 148, 152 and then compared at decision module 154 to detect the preferred equalization type for the received transmission burst 60 in accordance with the invention. Module 154 compares the GMSK total energy ($E_T^{gmsk}$) to a threshold value set by the GMSK error energy ($E_{NI}^{gmsk}$) multiplied by a constant ($\Delta$). The constant $\Delta$ identifies the threshold for the C/I level when choosing the preferred equalization type. Analysis has shown an optimized equalization determination under conditions where module 154 uses $\Delta=16$. If the total energy level in the GMSK channel ($E_T^{gmsk}$) is found to be higher than the scaled GMSK error energy level ($\Delta E_{NI}^{gmsk}$), it is determined that the SAIC operational environment has a high C/I and, accordingly, select signal 80 is set to enable MLSE equalization of the burst signal 60. Alternatively, if the total energy level in the GMSK channel ($E_T^{gmsk}$) is found to be lower than the scaled GMSK error energy level ($\Delta E_{N+I}^{gmsk}$), it is determined that the SAIC operational environment has a low C/I and, accordingly, select signal 78 is set to enable SAIC linear equalization of the burst signal 60. Module 154 performs a single comparison to determine the optimal equalization type, in one embodiment, although more comparisons can be made to increase the reliability of the determination methodology in other embodiments.

Figure 3:
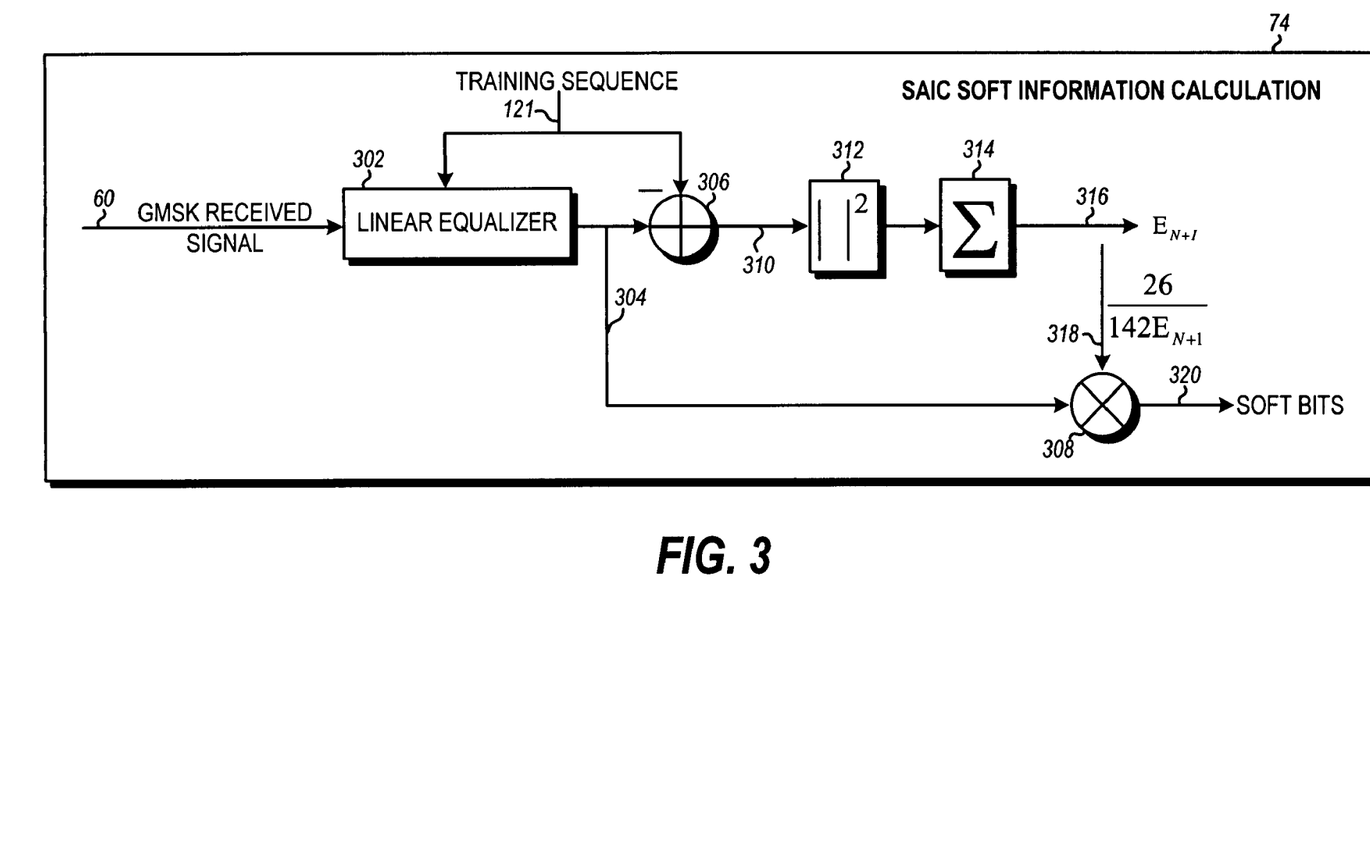
FIG. 3 shows a logical flow diagram of the operation of a linear equalizer soft information calculation, in accordance with a preferred embodiment of the present invention.
Figure 4:
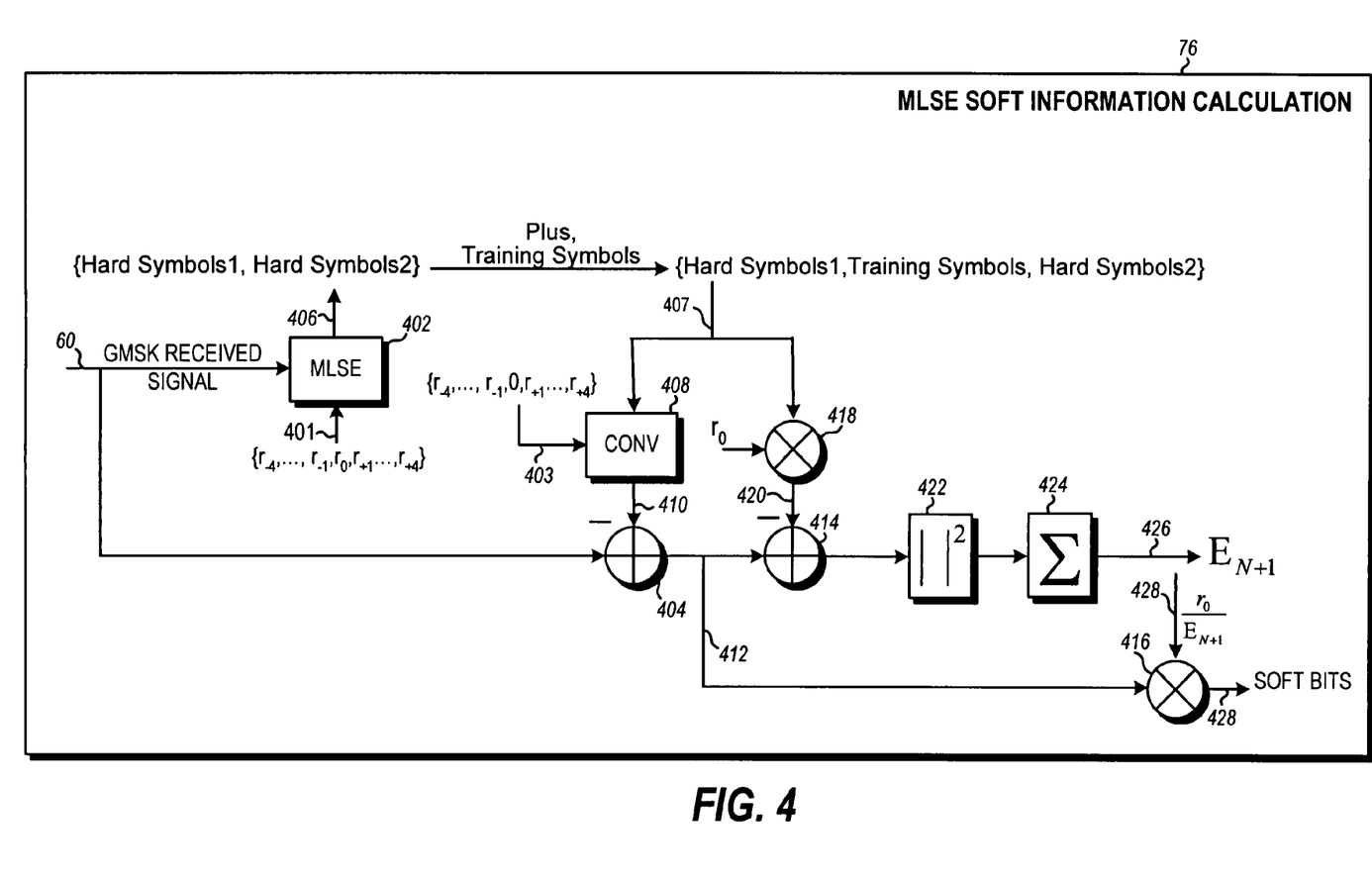
FIG. 4 shows a logical flow diagram of the operation of a MLSE soft-information calculation, in accordance with a preferred embodiment of the present invention.

FIGS. 3 and 4 show the soft information calculations used with the SAIC linear equalizer and the MLSE equalizer to produce the soft bits with balanced scaling between the two equalizations. With reference now to FIG. 3, there is shown a logical flow diagram of a soft-information calculation with the SAIC linear equalizer, in accordance with a preferred embodiment of the present invention. The GMSK received signal 60 is received at linear equalizer 302, which performs a SAIC linear equalization, taking advantage of the GMSK signal structure and operating on the complex values of the signal. Linear equalizer 302 also receives the GMSK training sequence 121, which has been rotated by $\pi/2$ per symbol. The SAIC linear equalized received signal 304 output from linear equalizer 302 is received by summer 306 at a positive input. Summer 306 also receives the rotated training sequence 121 at a negative input. Summer 306 calculates the difference between the equalized output and the desired output (the training sequence 121). The error signal 310 thus represents the difference between the rotated training sequence 121 and the equalized received signal 304. Error signal 310 is received at block 312 to generate its magnitude squared, and subsequently received at block 314 to be summed over the 26 symbol periods corresponding to the training sequence. The resulting output is the total error energy 316 ($E_{N+I}$) related to the noise plus interference of the GMSK received signal 60. This total error energy 316 is then inserted into a scaling factor 318 to balance the magnitude of soft information output from the SAIC linear equalizer with the soft information of the MLSE Equalization performed within different time slots where MLSE has been selected. Scaling factor 318 is comprised of the number "26" in the numerator and the error energy value 316 times the number "142" in the denominator $$\left(\text{i.e., } \frac{26}{142 E_{N+1}}\right),$$

as a result of SAIC linear equalization using the average of 26 symbol periods and MLSE using the average of 142 symbol periods per burst. Therefore, the equalized received signal 304 is multiplied by the scaling factor 318 by multiplier 308 to generate soft bits 320 on the output.

With reference now to FIG. 4, there is shown a logical flow diagram of a MLSE soft-information calculation, in accordance with a preferred embodiment of the present invention. GMSK received signal 60 is received by MLSE block 402 and at a positive input to summer 404. GMSK received signal 60 can be represented by the data set {Hard Symbols1, Training Symbols, Hard Symbols2}, where the "Hard Symbols1" represents the first 58 symbols, the "Training Symbols" represent the next 26 symbols, and the "Hard Symbols2" represents the last 58 symbols of the 142 symbol packet. MLSE block 402 also receives the auto-correlation $\{r_{-4}, \ldots, r_{-1}, r_0, r_{+1} \ldots, r_{+4}\}$ 401, of the estimated channel $h_n$ 116. MLSE block 402 implements the Maximum Likelihood Sequence Estimation, which is usually implemented using the Viterbi algorithm to compensate for the effects of the inter-symbol interference resulting from multi-path channel interference and other channel filtering effects. The Hard Symbols 406 of MLSE block 402 is the estimated hard symbols (Hard symbols1 and Hard symbols2) transmitted.

Convolution (CONV) block 408 performs a convolution of the Hard Symbols 407 {Hard Symbols1, Training Symbols, Hard Symbols2} with $\{r_{-4}, \ldots, r_{-1}, r_0, r_{+1} \ldots, r_{+4}\}$ 403 to generate an interference plus noise estimate 410. The output of the convolution performed by block 408 is received at a negative input of summer 404 and subtracted from the received GMSK signal 60 to generate soft bits 412 of the transmitted symbols. Soft bits 412 are received at positive inputs to summer 414 and multiplier 416. Multiplier 418 multiplies Hard Symbols 407 {Hard Symbols1, Training Symbols, Hard Symbols2} with $r_0$ to generate a scaled hard symbols 420, thereafter received at a negative input of summer 414. The output of summer 414 has its magnitude squared by block 422, and summed across 142 symbols by block 424 to generate error energy ($E_{N+I}$) 426, representing the total energy of the noise plus interference. As seen in FIG. 4, this energy value 426 is used as a divisor of the estimated channel energy ($r_0$), thereafter resulting in scaling factor 428 at the input of multiplier 416. Multiplier 416 outputs the product of soft bits 412 and error energy 426 as balanced soft bits 428.

While a preferred embodiment has been described as utilizing linear and MLSE equalization, the present invention is not restricted to using only the linear or MLSE equalization methods in the described manner. In principle, it is also possible to implement the invention by selecting between two or more equalization methods depending upon the interference level of the environment, in accordance with the invention. Also, as will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. In a digital telecommunication system, a method for dynamically selecting an equalization methodology for signal received from a transmitter at a receiver, said method comprising the steps of:
   receiving a signal at the digital telecommunication system;
   calculating an estimate of noise plus interference energy based on a difference between the received signal and a synthesized training signal;
   calculating a total energy of at least a portion of the received signal based on the received signal;
   comparing the estimate of noise plus interference energy to the total energy of at least a portion of the received signal to determine an equalization method to be used for message equalization of the received signal; and
   equalizing the received signal using the determined equalization method to perform message equalization of the received signal.

2. The method according to claim 1, wherein the received signal contains a sequence of data symbols transmitted from the transmitter, and wherein each data symbol has been rotated through a phase rotation factor corresponding to a modulation type.

3. The method according to claim 2, wherein the data symbols include training symbols corresponding to a known training sequence.

4. The method according to claim 1, further comprising the steps of:
   rotating a known training sequence through a phase rotation factor to generate a rotated training sequence;
   forming a channel estimation function based on the rotated training sequence and the received signal; and
   forming the synthesized training signal based on the channel estimation function and the rotated training sequence.

5. The method according to claim 4, wherein the synthesized training signal is formed by a summation of products of the rotated training sequence and the channel estimation function for individual moments in time.

6. The method according to claim 4, wherein the received signal contains a sequence of data symbols transmitted from the transmitter, wherein each data symbol has been rotated through a phase rotation factor corresponding to a modulation type, the method further comprising the steps of:

forming a temporal position function identifying each data symbol in the sequence of data symbols based on the channel estimation function.

7. The method according to claim 6, wherein the temporal position function is calculated based on a maximum correlation between the rotated training sequence and the received signal.

8. The method according to claim 7, wherein the channel estimation function is formed as a function of the temporal position function.

9. The method according to claim 1, further comprising the steps of forming a subtraction between the received signal and the synthesized training signal, and squaring a magnitude of the subtraction to form the estimate.

10. The method according to claim 1, further comprising the steps of forming a summation of products of the received signal for individual moments in time and squaring a magnitude of the summation to form the total energy.

11. The method according to claim 1, wherein the step of comparing further comprises comparing the total energy with a threshold value, wherein the threshold value comprises the estimate multiplied by a constant.

12. The method according to claim 11, wherein a first equalization methodology has preferred performance in low interference operational environments and a second equalization methodology has a preferred performance in high interference operational environments, further comprising the step of performing an equalization of the received signal using the first equalization methodology when the total energy is greater than the threshold value.

13. The method according to claim 12, wherein the equalization methodology for a low interference operational environment is Maximum Likelihood Sequence Estimation (MLSE).

14. The method according to claim 12, further comprising the step of performing an equalization of the received signal using the second equalization methodology when the total energy is less than the threshold value.

15. The method according to claim 14, wherein the equalization methodology for a high interference operational environment is linear equalization.

16. The method according to claim 14, further comprising generating a scaling factor used to scale a soft information output from the performed equalization methodology to generate balanced soft bits dependent on whether the first or second equalization methodology is selected.

17. An article of manufacture comprising a machine-readable medium including program logic embedded therein for performing the steps of claim 1.

18. A receiver in a digital telecommunication system, comprising:

a receiver module for receiving a signal containing a sequence of symbols transmitted from a transmitter; and a message recovery module, comprising means for performing message equalization and recovery on a received signal, wherein one of a plurality of equalization methodologies is dynamically selected for a given burst as a function of estimated noise plus interference energy relative to a total energy of at least a portion of that burst, and further wherein at least one of the plurality of equalizers is enabled for performing the selected equalization methodology.

19. The receiver according to claim 18, wherein the message recovery module includes switch logic that dynamically switches between at least two equalization methodologies based on whether an operational environment for the received signal has high interference.

20. The receiver according to claim 19, wherein the switch logic selects a MLSE equalization methodology for a low interference operational environment.

21. The receiver according to claim 19, wherein the switch logic selects a Single Antenna Interface Cancellation (SAIC) linear equalization methodology for a high interference operational environment.

22. The receiver according to claim 19, wherein message recovery module generates a scaling factor used to scale the soft information output from the enabled equalizer to generate balanced soft bits dependent on the selected equalization methodology.

23. The receiver according to claim 18, wherein the data communications system is Global System for Mobile Telephony (GSM) compliant.

* * * * *